US012731992B2

(12) United States Patent
Rodríguez et al.

(10) Patent No.: US 12,731,992 B2
(45) Date of Patent: Sep. 8, 2026

(54) METHODS AND SYSTEMS FOR DAMPING POWER OSCILLATIONS DURING FREQUENCY FLUCTUATIONS

(71) Applicant: VESTAS WIND SYSTEMS A/S, Aarhus N (DK)

(72) Inventors: Beatriz Callejo Rodríguez, Madrid (ES); Naveen Kumar Boggarpu, Tilst (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 282 days.

(21) Appl. No.: 18/550,270

(22) PCT Filed: Mar. 2, 2022

(86) PCT No.: PCT/DK2022/050035

§ 371 (c)(1),
(2) Date: Sep. 12, 2023

(87) PCT Pub. No.: WO2022/194330

PCT Pub. Date: Sep. 22, 2022

(65) Prior Publication Data

US 2024/0162711 A1 May 16, 2024

(30) Foreign Application Priority Data

Mar. 16, 2021 (DK) .......................... PA 2021 70117

(51) Int. Cl.

| | |
|---|---|
| ***H02J 3/0014*** | (2026.01) |
| ***H02J 3/38*** | (2006.01) |
| *H02J 101/28* | (2026.01) |

(52) U.S. Cl.
CPC ............ *H02J 3/00142* (2026.01); *H02J 3/38* (2013.01); *H02J 2101/28* (2026.01)

(58) Field of Classification Search
CPC ...................................................... H02J 3/003
See application file for complete search history.

(56) References Cited

U.S. PATENT DOCUMENTS

2015/0137520 A1* 5/2015 Garcia ..................... H02J 3/50 290/44
2016/0169199 A1 6/2016 Beekmann et al.
(Continued)

FOREIGN PATENT DOCUMENTS

CN 107332258 A 11/2017
CN 108599253 A 9/2018
(Continued)

OTHER PUBLICATIONS

Danish Patent and Trademark Office, 1st Technical Examination including The Search Report and Search Opinion for Application PA 2021 70117 dated Sep. 20, 2021.
(Continued)

*Primary Examiner* — Nathan L Laughlin
(74) *Attorney, Agent, or Firm* — Patterson + Sheridan, LLP; Gero G. McClellan

(57) ABSTRACT

Controlling a renewable energy power plant, such as a wind power plant, when a frequency level of a power network, to which the power plant is connected, is outside of a frequency deadband. Aspects of the invention may be used to control the active power output of a wind energy power plant and to dampen oscillations in the controlled power characteristic when the frequency level of the connected power network is fluctuating outside of the frequency deadband.

20 Claims, 5 Drawing Sheets

(56) References Cited

U.S. PATENT DOCUMENTS

| | | | | |
|---|---|---|---|---|
| 2018/0335020 | A1 | 11/2018 | Ayiranazhi Cailakam et al. | |
| 2019/0044337 | A1* | 2/2019 | Visser | H02J 3/241 |
| 2020/0274365 | A1* | 8/2020 | Hart | H02J 3/32 |
| 2024/0396337 | A1* | 11/2024 | Vestesen | H02J 3/32 |

FOREIGN PATENT DOCUMENTS

| | | | |
|---|---|---|---|
| CN | 109888796 | A | 6/2019 |
| EP | 3322060 | A1 | 5/2018 |
| EP | 2954605 | B1 | 1/2021 |

OTHER PUBLICATIONS

PCT, Notification of Transmittal of The International Search Report and The Written Opinion of The International Searching Authority, or The Declaration for Application PCT/DK2022/050035 dated Jun. 2, 2022.

Moeini Ali et al., "Optimal Robust Primary Frequency Response Control for Battery Energy Storage Systems, 2019 IEEE Power & Energy Storage Systems," 2019 IEEE Power & Energy Society General Meeting (PESGM), IEEE, Dated: Aug. 4, 2019, pp. 1-5.

* cited by examiner

METHODS AND SYSTEMS FOR DAMPING POWER OSCILLATIONS DURING FREQUENCY FLUCTUATIONS

TECHNICAL FIELD

The present disclosure relates to methods and systems for damping power oscillations that arise during frequency fluctuations on a power network.

BACKGROUND

Regulators and operators of power networks expect connected power plants to adhere to a 'grid code' and to provide particular services to the power network.

For example, some operators require power plants to support the power network when the frequency of the power network deviates from the normal operational range or a permissible range, also referred to as a frequency deadband. A range of control strategies have been developed for wind power plants to provide support during such frequency deviations. For example, power plant controllers and wind turbine controllers typically implement frequency support by changing active power output levels to counteract the frequency deviation. In under-frequency events, where the frequency level deviates below a lower limit of the frequency deadband, active power output levels are increased to support the network. In overfrequency events, where the frequency level rises above an upper limit of the frequency deadband, active power output levels are decreased to provide support.

However, under such approaches fluctuations in the frequency of the power network outside the frequency deadband can cause an oscillatory active power output, which can lead to inadequate support of the power network and power plant damage.

It is an aim of the present invention to address one or more of the disadvantages associated with the prior art.

SUMMARY OF THE INVENTION

According to an aspect of the present invention there is provided a method for controlling a renewable energy power plant when a frequency level of a power network, to which the power plant is connected, is outside of a frequency deadband. The renewable energy power plant may be wind power plant, for example, comprising one or more wind turbine generators. The method comprises: receiving a measured frequency level of the power network; determining and dispatching set points for controlling a power characteristic of the power plant based on the measured frequency level; monitoring changes in the measured frequency level to detect inflections in the measured frequency level; and when an inflection is detected, applying a damping control scheme comprising determining and dispatching set points for controlling the power characteristic based on that inflection, until one or more damping control conditions are satisfied.

In this manner, during a frequency event (i.e. when the frequency level is outside of the permissible range/frequency deadband), the method provides frequency-dependent control of the power characteristic that is effectively frozen, or suspended, when a frequency inflection is detected in the connected power network. The controlled power characteristic may take various suitable forms, such as an active power output of the power plant for example. Such control has the effect of dampening oscillations in the controlled power characteristic that may otherwise develop during the frequency event, as the frequency level of the connected power network fluctuates. Consequently, the method mitigates oscillations in the controlled power characteristic, protecting the power plant and supporting a rapid return of the power network frequency to the deadband.

Optionally, the damping control scheme comprises determining and dispatching set points at a target value for controlling the power characteristic. The target value may, for example, be determined based on the frequency level at the detected inflection. In an example, the target value may be determined based on a measurement of the controlled power characteristic at the detected inflection. In this manner, the target value is fixed in dependence on the detected inflection and may have the effect of freezing the level of the power characteristic or otherwise freezing a desired level for the power characteristic to reach.

Optionally, the damping control scheme comprises determining and dispatching set points that ramp towards the determined target value for the controlled power characteristic. For example, the damping control scheme may determine a ramp-up rate, or a ramp-down rate, for respectively increasing, or decreasing, the determined set points at a constant rate. Such ramp rates may be pre-determined, for example.

In an example, the damping control scheme comprises dispatching set points at the target value until the one or more damping control conditions are satisfied. For example, the damping control scheme may start dispatching set points at the target value in response to detecting the inflection or the damping control scheme may start dispatching set points at the target value once the target value has been reached, for example once the set points have ramped up, or down, to the target value.

Optionally, the damping control scheme comprises determining the target value for the controlled power characteristic using a look-up table comprising a plurality of target values for the controlled power characteristic, each target value corresponding to a respective frequency of the power network.

In an example, the damping control scheme may comprise determining a ramp rate for ramping the set points towards the target value for the controlled power characteristic, the ramp rate being determined using a look-up table comprising a plurality of ramp rates for the set points. For example, each ramp rate in the look-up table may correspond to at least one of: a respective frequency of the power network; a respective target value for the controlled power characteristic, and/or a respective difference between a measurement of the controlled power characteristics and the target value for the controlled power characteristic.

Optionally, the one or more damping control conditions may include a condition that is satisfied upon expiry of an application period. For example, the damping control scheme may be configured to start the application period once the controlled power characteristic reaches the target value.

In an example, the method may further comprise comparing the measured frequency level to the frequency deadband to determine an overfrequency event or an underfrequency event. In the overfrequency event, the measured frequency level is above an upper limit of the frequency deadband. In the underfrequency event, the measured frequency level is below a lower limit of the frequency deadband.

Optionally, if an overfrequency event is determined, changes in the measured frequency level may be monitored to detect inflections in the form of peaks of the measured frequency level. Optionally, if an underfrequency event is determined, changes in the measured frequency level may be monitored to detect inflections in the form of troughs of the measured frequency level.

In an example, the one or more damping control conditions may include a condition that is satisfied upon detection of a further inflection. In particular, the further inflection may, for example, takes the form of: a further peak of the measured frequency level during an overfrequency event, the further peak being at an increased frequency level; or a further trough of the measured frequency level during an underfrequency event, the further trough being at a reduced frequency level.

Optionally, upon detection of the further inflection, the current damping control scheme is removed and another damping control scheme is applied for determining and dispatching set points for controlling the power characteristic based on the further inflection.

In an example, the one or more damping control conditions may include a condition that is satisfied when the measured frequency level rises above a lower threshold frequency. Optionally, said condition may be satisfised when the measured frequency level rises above the lower threshold frequency during a determined underfrequency event.

In an example, the one or more damping control conditions may include a condition that is satisfied when the measured frequency level falls below an upper threshold frequency. Optionally, said condition may be satisfised when the measured frequency level falls below the upper threshold frequency during a determined overfrequency event.

Optionally, the method may further comprise determining the upper threshold frequency, and/or the lower threshold frequency, based on the measured frequency level at the detected inflection.

In an example, the method may further comprise receiving one or more user inputs and determining one or more parameters of the damping control conditions based on the one or more user inputs. For example, at least one of the upper threshold frequency, the lower threshold frequency, and/or the application period may be determined by one or more user inputs.

Optionally, the one or more damping control conditions include a condition that is satisfied upon receiving an override command. For example, the override command may be provided by one or more user inputs.

In examples, the method may further comprise removing the damping control scheme in dependence on the one or more damping control conditions being satisfied.

Upon removal of the damping control scheme, the set points may, for example, be determined and dispatched based on a frequency level measured when, or after, the damping control scheme is removed.

Optionally, upon removal of the damping control scheme, the method may further comprise determining a target value for the controlled power characteristic based on the measured frequency level and determining and dispatching set points based on that target value. For example, set points that ramp towards that target value may be determined and dispatched. For example, method may comprises determining a ramp-up rate, or a ramp-down rate, for respectively increasing, or decreasing, the determined set points at a constant rate towards that target value.

The controlled power characteristic may, for example, includes at least one of the following: an active power output of the power plant; a voltage level of the power plant; and/or a reactive power output of the power plant.

According to another aspect of the invention there is provided a power plant controller configured to perform the method described in a previous aspect of the invention.

According to an aspect of the invention, there is provided a computer-readable storage medium comprising instructions that, when executed by a computer, cause the computer to perform the method described above.

Within the scope of this invention it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the present invention relates to methods and systems for controlling the power characteristics of a renewable energy power plant such as a wind power plant, the term ‘power characteristics’ encompassing characteristics including an active power output, a reactive power output and/or a voltage level, for example. Particularly though, the present invention relates to methods and systems for providing such control when the frequency level of a connected power network is outside of an acceptable or permissible frequency range, known as a frequency deadband. In the following description, periods during which the frequency level deviates outside of the frequency deadband, may be referred to as ‘frequency events’.

During such frequency events, the methods and systems of the present invention are configured to determine and dispatch set points for controlling the power characteristics of one or more generators of the power plant based on the frequency level of the connected power network. However, the frequency level can fluctuate rapidly during such frequency events, and so the methods and systems of the present invention are advantageously configured to dampen oscillatory behaviour in the power characteristics by monitoring the frequency level of the power network and effectively freezing the power characteristics whenever a frequency inflection is detected. For example, when a frequency peak is detected during an overfrequency event, a damping control scheme is applied, in which set points for controlling the power characteristics of the renewable generators are determined and dispatched based on the detected inflection until one or more damping control conditions are satisfied. The damping control conditions effectively provide one or more conditions for allowing the power characteristics to be increased, or decreased, again to further support the connected power network and may include conditions that are satisfied upon expiry of a threshold period of time, or in dependence on the frequency level falling below a threshold frequency, for example. The benefit of this is that oscillations in the controlled power characteristic are reduced, mitigating damage to the power plant and enabling a faster return of the connected power network to the frequency deadband.

Figure 1:
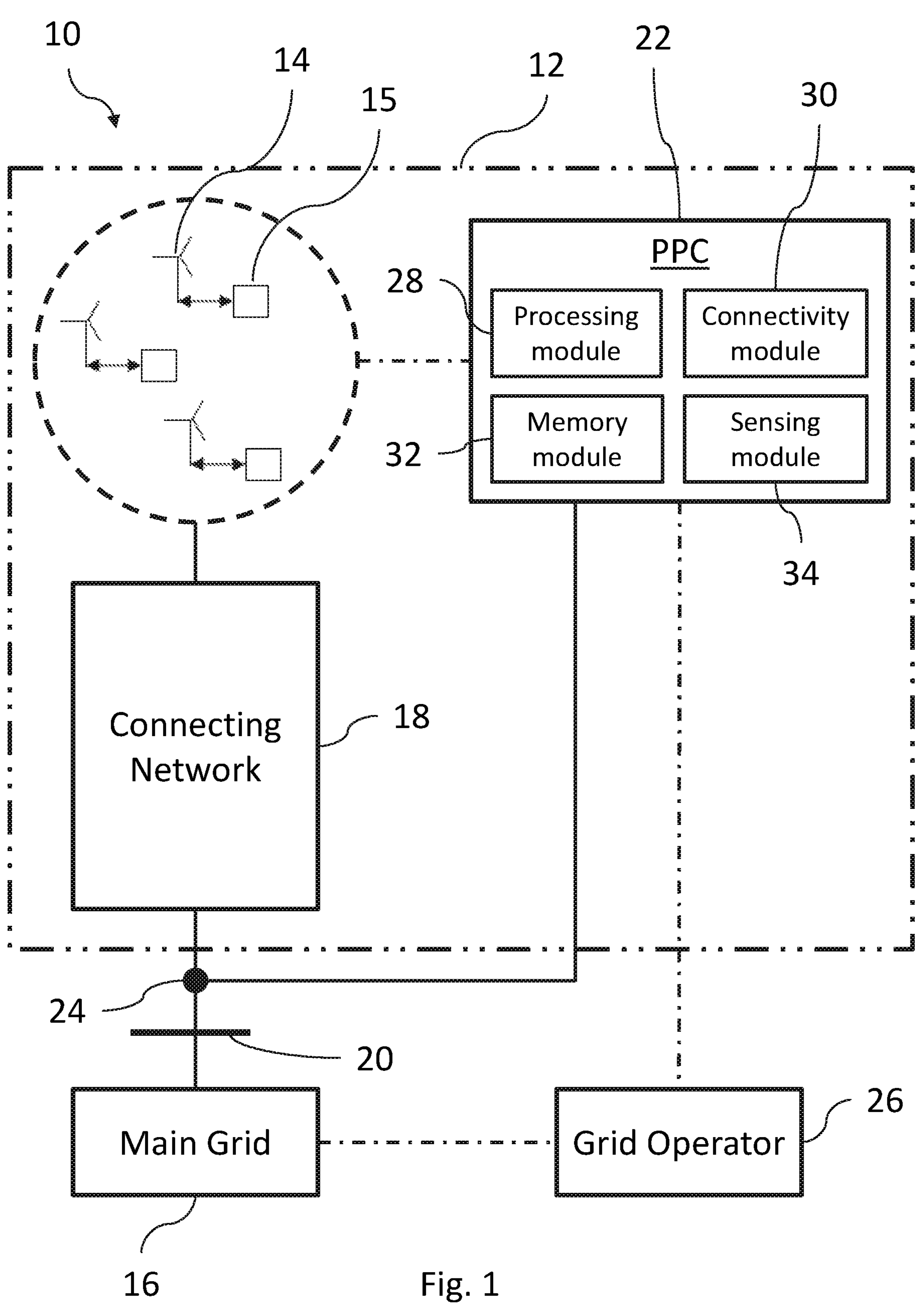
FIG. 1 shows schematically a power network connected to a wind power plant that includes a power plant controller.

FIG. 1 illustrates a typical architecture in which a renewable energy power plant is connected to a main grid or wider power network. In the example shown in FIG. 1, the renewable energy power plant is a wind power plant (WPP). As will be understood by the skilled reader, a WPP comprises at least one wind turbine generator (WTG), and is also known as a wind park or a wind farm. A WTG is commonly referred to as a 'wind turbine'. The example shown is representative only and the skilled reader will appreciate that other specific architectures are possible. In other examples, the power plant may include other renewable energy sources such as a solar power plant, a bio energy power plant, an ocean/wave/tidal energy plant, or a hybrid power plant having a combination of different types of renewable energy power plants. Thus, the invention relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition, or as alternatives, to the components shown and described in FIG. 1. Such changes would be within the capabilities of the skilled person.

FIG. 1 shows a power system 10 incorporating a WPP 12. In this example, the WPP 12 includes a plurality of WTGs 14 and a power plant controller 22, referred to hereafter as PPC 22. Each of the plurality of WTGs 14 converts wind energy into electrical energy, which is transferred from the WPP 12 to a main power network, or 'main grid' 16, as active power and/or current, for distribution.

Although not illustrated in FIG. 1, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current, and/or power, requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 also includes a connecting network 18 for connecting the WPP 12 to the main grid 16 (also called the main power network). In this example, the WPP 12 and the main grid 16 are connected at a Point of Interconnection (PoI) 20, which is an interface between the WPP 12 and the main grid 16. The PoI 20 may also be referred to as the Point of Common Coupling, which may be abbreviated to 'PCC' or 'PoCC'.

The Power Plant Controller (PPC) 22 is connected to the main grid 16 at a Point of Measurement (PoM) 24 and is connected to the WTG controllers 15. For example, the PPC 22 may be configured to receive one or more measurement signals from the PoM 24 comprising measurements of the power supply from the WPP 12 to the main grid 16 and/or a frequency level of the main grid 16. The role of the PPC 22 is to act as a command and control interface between the WPP 12 and the grid 16, and more specifically, between the WPP 12 and a grid operator 26, such as a transmission system operator (TSO) or a distribution system operator (DSO). The WPP 12 is capable of altering its power or current output in reaction to commands received from the PPC 22.

The PPC 22 is a suitable computer system for carrying out the controls and commands as described herein and so may incorporate a processing module 28, a connectivity module 30, a memory module 32 and a sensing module 34, as shown in FIG. 1.

The connectivity module 30, the memory module 32, and/or the sensing module 34 are configured to provide the processing module 28 with information that is indicative of a frequency level of the main grid 16, as well as power levels, current levels and/or voltage levels of the WTGs 14 and/or the WPP 12.

For example, the sensing module 34 may receive such information directly from one or more connected sensors (e.g. at the PoM 24) and communicate the information to the processing module 28. Alternatively, or additionally, the information may be determined by one or more systems that are connected to the connectivity module 30, such as the WTG controllers 15, and the information may be communicated, in turn, through the connectivity module 30 to the processing module 28. In each case, the determined information may be stored permanently, or temporarily, in the memory module 32, from which it may be recalled, on demand, by the processing module 28. The PPC 22 may also receive information regarding the grid 16 and/or local buses, substations and networks from an energy management system (not shown).

As part of its operation, the PPC 22 generates and sends dispatch signals to the WTG controllers 15. The WTG controllers 15 control the WTGs 14 according to set points contained within the dispatch signals.

In a frequency event, when the frequency level of the main grid 16 deviates from the frequency deadband, the PPC 22 acts to operate the WTGs 14 to provide frequency support to the grid 16. The frequency deadband is generally a small region around the operating frequency of the grid 16, typically 50 Hz, or in some examples 60 Hz, as measured at the Pol 20 or PoM 24. For example, the operating frequency may be 50 Hz and upper and lower frequency limits of the deadband may be +/−0.035 Hz.

In accordance with the control strategies mentioned above, in an example, the PPC 22 may issue dispatch signals configured to control one or more power characteristics of the WTGs 14 in order to provide such frequency support. For example, the dispatch signals may be configured to control the active power output, the reactive power output, and/or the voltage level, of the WTGs 14 so that frequency levels are supported in returning to the deadband.

To give an example, in an underfrequency event when the frequency level of the grid 16 drops below the lower limit of the deadband, the PPC 22 may provide frequency support by dispatching increased active power set points to the WTGs 14, i.e. set points for causing the WTGs 14 to increase the active power supplied to the grid 16. Similarly, in an overfrequency event when the grid frequency rises above the upper limit of the deadband, the PPC 22 may provide frequency support by dispatching decreased active power set points to reduce the active power supply.

Figure 2:
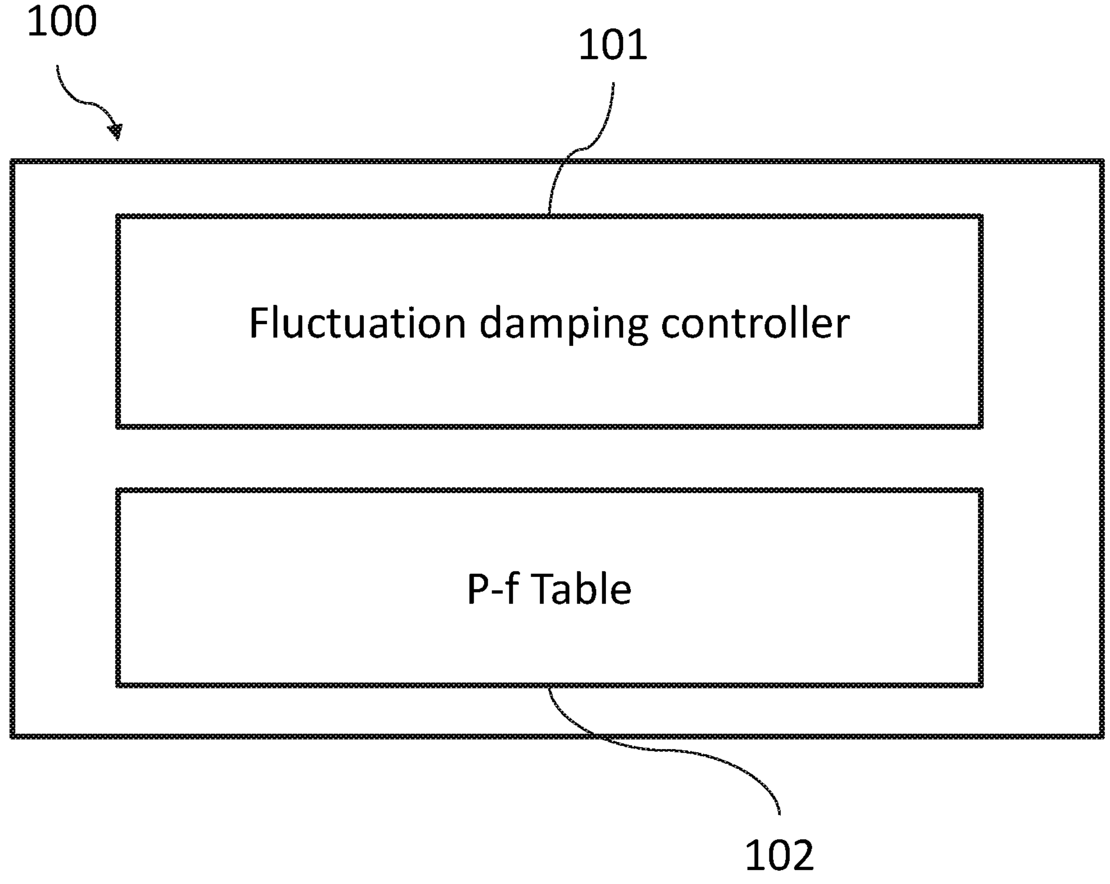
FIG. 2 shows a system diagram of a control module, in accordance with an embodiment of the invention, of the power plant controller of FIG. 1.

FIG. 2 illustrates a program, algorithm, or "control module" 100, in accordance with an embodiment of the invention, which forms part of the processing module 28 of the PPC 22 for determining and dispatching such set points during a frequency event.

In particular, while the frequency level of the connected main grid 16 is outside of the frequency deadband, the control module 100 is configured to receive a measured frequency level of the connected main grid 16, or information that is indicative of that frequency level, and to determine set points for controlling one or more power characteristics of the WTGs 14 based on the frequency level.

Here it shall be appreciated that the measured frequency level provides a precise measurement of the grid frequency, for example having a resolution in the order of mHz or μHz. In an example, the measured frequency level may be filtered to remove noise associated with the measurements. For example, the measured frequency level may be noise-filtered such that negligible changes, i.e. changes between successive measurements that are below respective upper or lower thresholds, are neglected. The control module 100 may receive such a noise-filtered measurement signal or apply suitable noise-filters to determine such a signal itself.

The one or more power characteristics of the WTGs 14 controlled by the control module 100 may, for example, include an active power output, a reactive power output, or a voltage level, of one or more of the WTGs 14. Nonetheless, for the sake of simplicity, in the following description the example control module 100 is configured to control the active power output of the WTGs 14 and the determined set points are active power set points for controlling said active power output. This example is not intended to be limiting on the scope of the invention, however.

Ordinarily, the active power set points may be determined based on the measured frequency level of the connected main grid 16 and vary, in a corresponding manner, with that measured frequency level.

To give an example, the control module 100 may be configured to determine the active power set points based on a reference active power level, which may start at a baseline value and ramp up (i.e. increase at a constant rate) or ramp down (i.e. decrease at a constant rate) in dependence on the measured frequency level. Here, the baseline value may correspond to an estimate of the available active power for the WPP 12 to supply to the main grid 16, such as a maximum 'rated' amount of power that could be supplied to the main grid 16 for the respective conditions, such as a given wind speed condition.

For this purpose, the control module 100 may include one or more look-up tables 102, as shown in FIG. 2, comprising active power target values for respective frequency level measurements and/or pre-determined ramp rates for increasing or decreasing the reference active power level.

Figure 3:
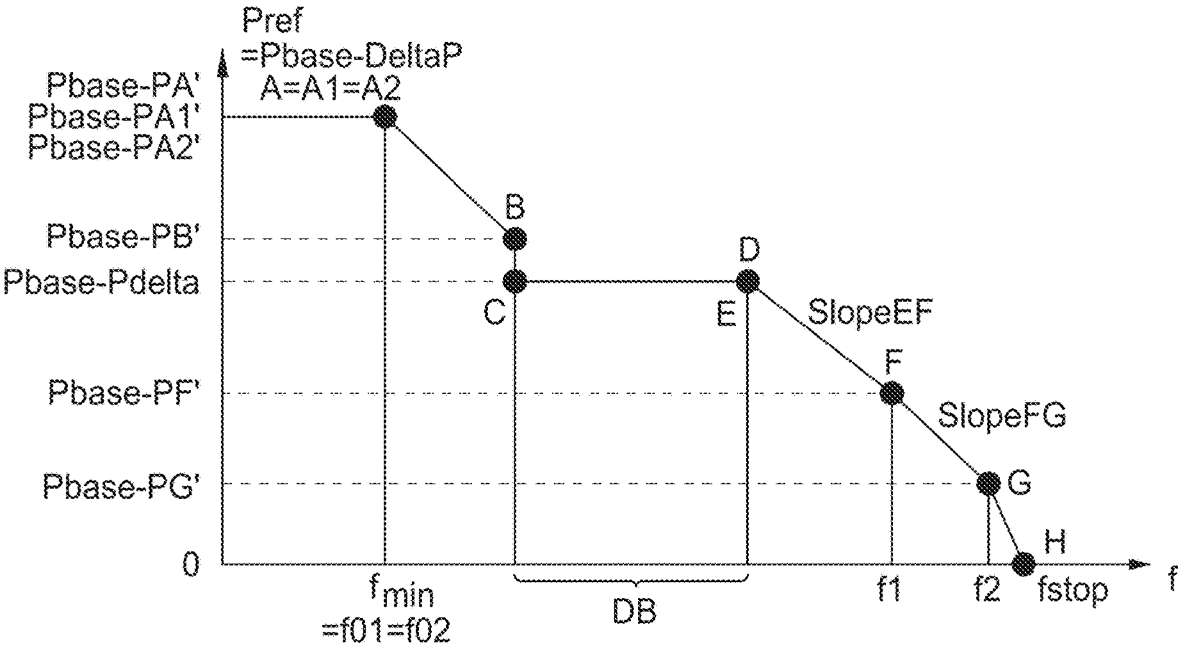
FIG. 3 shows an example P-f curve of the control module of FIG. 2.

For example, the look-up table 102 may include a P-f curve for matching the frequency level measurement, (f), to a respective active power target value, P(f). By way of illustration, an example P-f curve of the type that the skilled person will be familiar with is shown in FIG. 3.

The example P-f curve shows a frequency deadband, DB, defining a frequency range over which the active power target value, P(f), is substantially constant. The example P-F curve also shows a prescribed increase in the active power target value, P(f), when the frequency level falls below the frequency deadband, DB, (during an underfrequency event) and a prescribed decrease in the active power target value, P(f), when the frequency level rises above the frequency deadband, DB, (during an overfrequency event). As shown in this example, the prescribed increase, and/or decrease, of the active power target value, P(f), may include a step change in the active power target value, P(f), and/or one or more different slopes defining the change in the active power target value, P(f), as the frequency level deviates further from the frequency deadband, DB. For example, the P-f curve may be divided into a series of frequency bands and the slope of the P-f curve may increase or decrease in successive frequency bands as the frequency level deviates further from the frequency deadband, DB. Additionally, in some examples, the P-f curve may also include a minimum, and/or a maximum, frequency level, beyond which the active power target value, P(f), may be held substantially constant, as shown in FIG. 3.

The look-up table 102 may additionally, or alternatively, include pre-determined ramp rates in the form of one or more predetermined ramp up rates, and/or ramp down rates, for respectively increasing or decreasing the reference active power level according to respective conditions of the WPP 12 and/or the grid 16. For example, the look-up table 102 may include one or more predetermined ramp up, or ramp down rates, corresponding to respective frequency level measurements, changes in the measured frequency level, the reference active power level, and/or active power target values, such as an active power target values corresponding to the measured frequency level.

By way of example, during an overfrequency event, the control module 100 may be configured to access the look-up table 102 to determine a respective ramp down rate for reducing the reference active power level (and hence the active power set points) proportionally to a respective increase in the measured frequency level. In this manner, the control module 100 may support the main grid 16 in returning to the frequency deadband by controlling the WTGs 14 to produce less active power. Subsequently, as the measured frequency level returns towards the frequency deadband, the control module 100 may be configured to compare the reference active power level to the baseline value and to determine a ramp-up rate from the look-up table 102 (based on the comparison) in order to restore the reference active power level towards the baseline value.

Various methods are known in the art for determining active power set points based on the measured frequency level of the connected grid 16 though and it shall be appreciated that the above examples are not intended to be limiting on the scope of the invention.

Nonetheless, during a frequency event, the frequency level can fluctuate and become unstable, particularly in relatively sensitive grids. Where the active power output is controlled based on the measured frequency level, such fluctuations can lead to significant oscillations in the active power output. For example, the fluctuating frequency level may cause the reference active power level to rapidly ramp up and ramp down, becoming very oscillatory. Such power oscillations can lead to the components of the WPP 12 and/or the grid 16 becoming damaged.

In order to mitigate such oscillations in the active power output, the control module 100 of the present invention advantageously includes a damping controller 101 incorporating an alternative program, algorithm, or damping control scheme for providing a dampened active power output.

In particular, the control module 100 is configured to monitor the measured frequency level to detect inflections, in the form of peaks or troughs, in the measured frequency level and, when a suitable inflection is detected, the damping controller 101 is configured to determine and dispatch active power set points corresponding to the measured frequency level at the inflection, until one or more so-called damping control conditions are satisfied. In this context, a suitable inflection may be a frequency peak during an overfrequency event or a frequency trough during an underfrequency event. In each case, the inflection may, for example, be a noise-filtered inflection, having a peak-to-peak amplitude that exceeds a respective inflection detection threshold. However, such an example is not intended to be limiting on the scope of the invention.

Hence, following a frequency inflection, the damping controller 101 effectively ignores further changes in the measured frequency level and the active power set points are therefore determined and dispatched based on a constant reference frequency level for a prolonged period of time. This has the effect of dampening any oscillatory behaviour in the active power output, as the measured frequency level continues to fluctuate.

It shall be appreciated that the damping controller 101 may use the detected inflection to determine the active power set points according to one or more suitable methods. To give an example, the damping controller 101 may be configured to determine the active power set points substantially as described above, for example, using the look-up table 102 to determine an active power target value P(f) for the frequency level (f) at the detected inflection and determining a suitable ramp up, or ramp down, rate for adjusting the reference active power level towards that active power target value, P(f), based on a comparison therebetween. Once the reference active power level reaches the active power target value, P(f), the control module 100 may dispatch active power set points at that value, P(f), until the one or more damping control conditions are satisfied.

In examples of the invention, the one or more damping control conditions may take various suitable forms, as shall be appreciated, including any of the following conditions provided by way of example.

One such damping control condition may be satisfied upon expiry of an application period, such as a minimum period of time for which the damping control scheme determines and dispatches active power set points based on the detected inflection. For example, the damping controller 101 may be configured to start the application period when the active power output of the WTGs 14 reaches the determined active power target value, P(f), and to maintain that active power output for a predetermined period of time. The period of time may be set by one or more user inputs, for example.

Another damping control condition may be satisfied upon detection of a further inflection in the measured frequency level. In this case, the damping control scheme may be effectively reset and reapplied, with the active power set points being determined and dispatched based on the measured frequency level corresponding to the further frequency inflection. In other words, upon detection of the further inflection, the current damping control scheme may be removed and another damping control scheme may be applied for determining and dispatching the active power set points based on the further inflection.

To reduce the sensitivity of the damping controller 101, and thereby to provide additional damping, such a damping control condition may, for example, only be satisfied if a subsequent inflection is detected that is further removed from the frequency deadband than the inflection upon which the present set points are based. In other words, the damping control condition may only be satisfied if a further peak is detected during an overfrequency event and the further peak is at a greater frequency level than the original peak; or if a further trough is detected during an underfrequency event and the further trough is at a lower frequency level than the original trough.

In a similar manner, another damping control condition may be satisfied simply when the measured frequency level deviates further from the frequency deadband than the inflection upon which the present set points are based. In other words, the damping control condition may be satisfied if the measured frequency level exceeds the original frequency peak during an overfrequency event or if the measured frequency level falls below the original frequency trough during an underfrequency event.

A further condition may be satisfied when the measured frequency level rises above a lower threshold frequency. Preferably, this damping control condition may be limited to underfrequency events. Similarly, another condition may be satisfied when the measured frequency level falls below an upper threshold frequency. Preferably, this further damping control condition may be limited to overfrequency events. The upper threshold frequency, and/or the lower threshold frequency, may be user-defined, for example, or the damping controller 101 may be configured to determine such thresholds, for example based on the measured frequency level at the detected inflection.

In an example, the damping controller 101 may be configured to receive one or more user inputs. For example, the damping controller 101 may be configured to receive one or more user inputs and to determine one or more parameters of the damping control conditions on the basis of such user inputs. For example, the damping controller 101 may determine the duration of the application period, described above, based on the one or more user inputs. Additionally, or alternatively, such user inputs may be utilised to manually intervene in the damping control. For example, another damping control condition may be satisfied upon receiving an override command provided by a user through one or more of the user inputs.

In some embodiments of the invention, the control module 100 may be configured to remove or deactivate the damping control scheme once one, or each, of the damping control conditions are satisfied. Once removed, the control module 100 may be configured to determine and dispatch the set points based on the measured frequency level instead. For example, the control module 100 may be configured to access the look-up table 102 and to determine an active power target value, corresponding to the measured frequency level, upon removal of the damping control scheme and to determine a ramp up, or ramp down, rate for adjusting the reference active power level based on a comparison between the determined active power target value and the reference active power level. Such a ramp rate may, for example, be applied until a further inflection is detected whilst the measured frequency level is outside of the frequency deadband.

The operation of the control module 100 shall now be described with additional reference to FIGS. 4 to 6.

Figure 4:
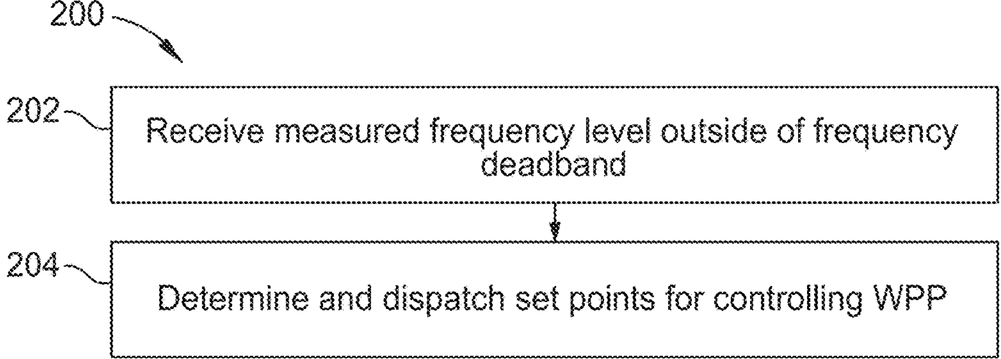
FIG. 4 shows a method, in accordance with an embodiment of the invention, of operating the control module of FIG. 2.
Figure 5:
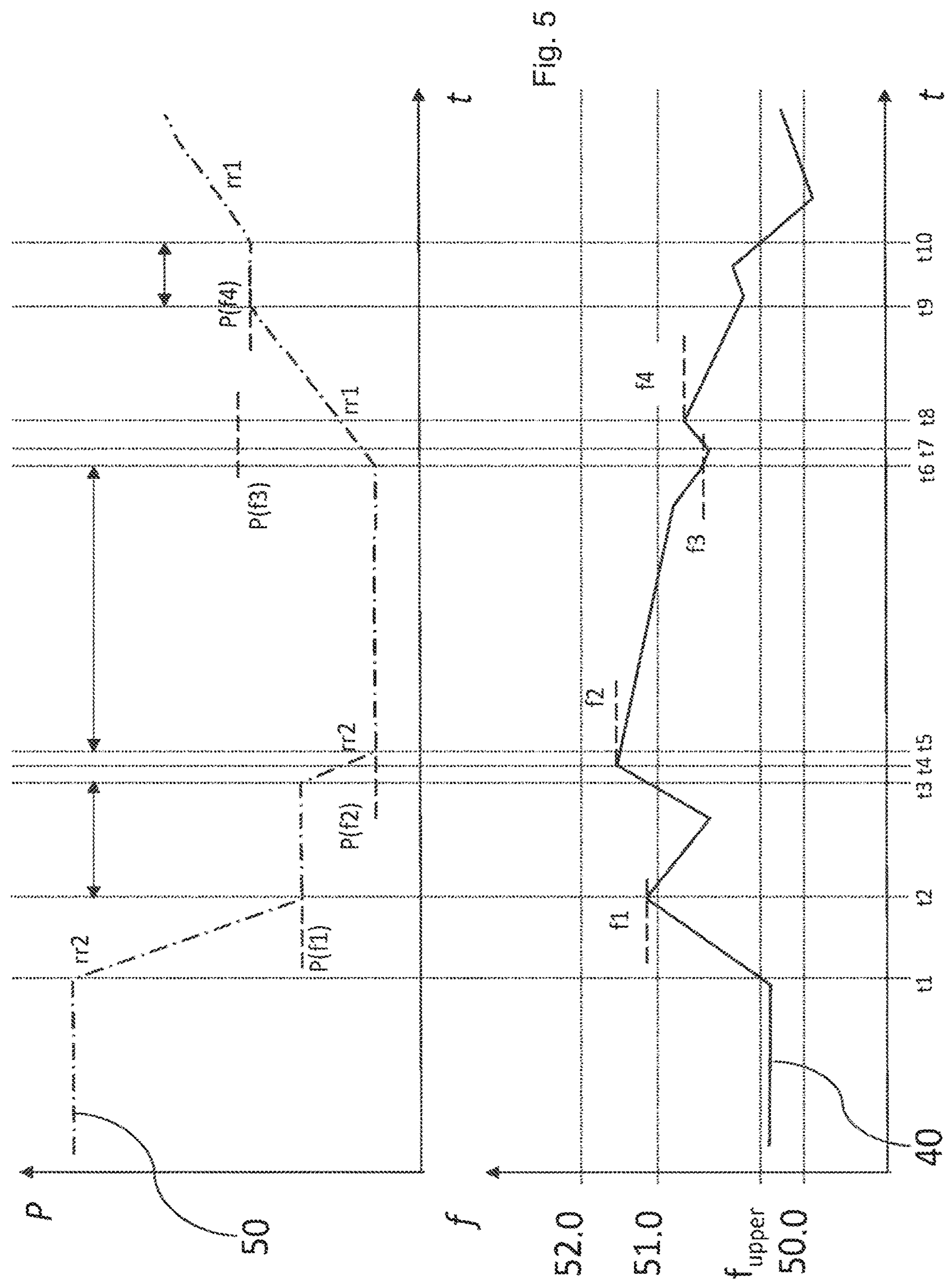
FIG. 5 shows a pair of charts illustrating the frequency level of a power network connected to the wind power plant of FIG. 1 and corresponding active power set points, determined according to the method shown in FIG. 4, for controlling the active power output from the wind power plant of FIG. 1 during a frequency event.

FIG. 4 shows an example method 200 of controlling the active power output of the WPP 12, in accordance with an embodiment of the invention, and FIG. 5 shows a pair of charts illustrating the measured frequency level 40 of the main grid 16 and the reference active power level 50, which represents the active power set points determined in accordance with the method 200.

As shown in FIG. 5, during an initial period, the measured frequency level 40 of the main grid 16 may be within an acceptable range of frequencies around the normal operating frequency of the grid 16, known as the frequency deadband, having a frequency that is between an upper limit, $f_{upper}$, and a lower limit, $f_{lower}$, of the frequency deadband. For context, the normal operating frequency of the grid 16 is 50 Hz in this example, so the upper limit, $f_{upper}$, may be a frequency of 50.035 Hz, and the lower limit, $f_{lower}$, may be a frequency of 49.965 Hz, for example.

During such conditions the PPC 22 may be configured to control the active power output of the WPP 12 according to a deadband frequency mode of operation. The deadband frequency mode of operation may be controlled by a controller of the processor module 28 other than the control module 100, or by another control system of the PPC 22, for example.

In accordance with the deadband frequency mode of operation, the PPC 22 may, for example, control the WPP 12 so as to satisfy the power demands of the grid operator 26 and to protect the WTGs 14, applying power curtailment, or power boosting, as necessary.

At this time, the control module 100 may determine active power set points that are not dispatched to the WTGs 14. For example, the control module 100 may determine active power set points at the baseline value for the respective conditions, as indicated by the reference active power level 50 in FIG. 5.

However, sudden changes in power generation, or load, within the main grid 16 can lead to an overfrequency event, or an underfrequency event, in which the frequency level of the main grid 16 crosses the frequency deadband.

For example, as shown in FIG. 5, an overfrequency event may occur and the frequency level 40 may cross, and exceed, the upper limit, $f_{upper}$, of the frequency deadband, at a time t1.

At this point, the method 200 of controlling the active power output of the WPP 12, as shown in FIG. 4, may be initiated. In particular, when the frequency level 40 crosses the frequency deadband, i.e. at the point t1, the control module 100 may receive a measurement of the frequency level 40 of the grid 16 and determine, in step 202, that the frequency level 40 is outside of the frequency deadband. For example, the control module 100 may compare the measured frequency level 40 to the upper limit, $f_{upper}$, of the frequency deadband and detect an overfrequency event, as in the example in FIG. 5.

On this basis, the control module 100 may proceed, in step 204, to determine and dispatch active power set points for controlling the active power output of the WPP 12 during the frequency event. In this manner, the PPC 22 effectively switches to a frequency event mode of operation, controlled by the control module 100, as shall now be described in more detail with additional reference to FIG. 6.

Figure 6:
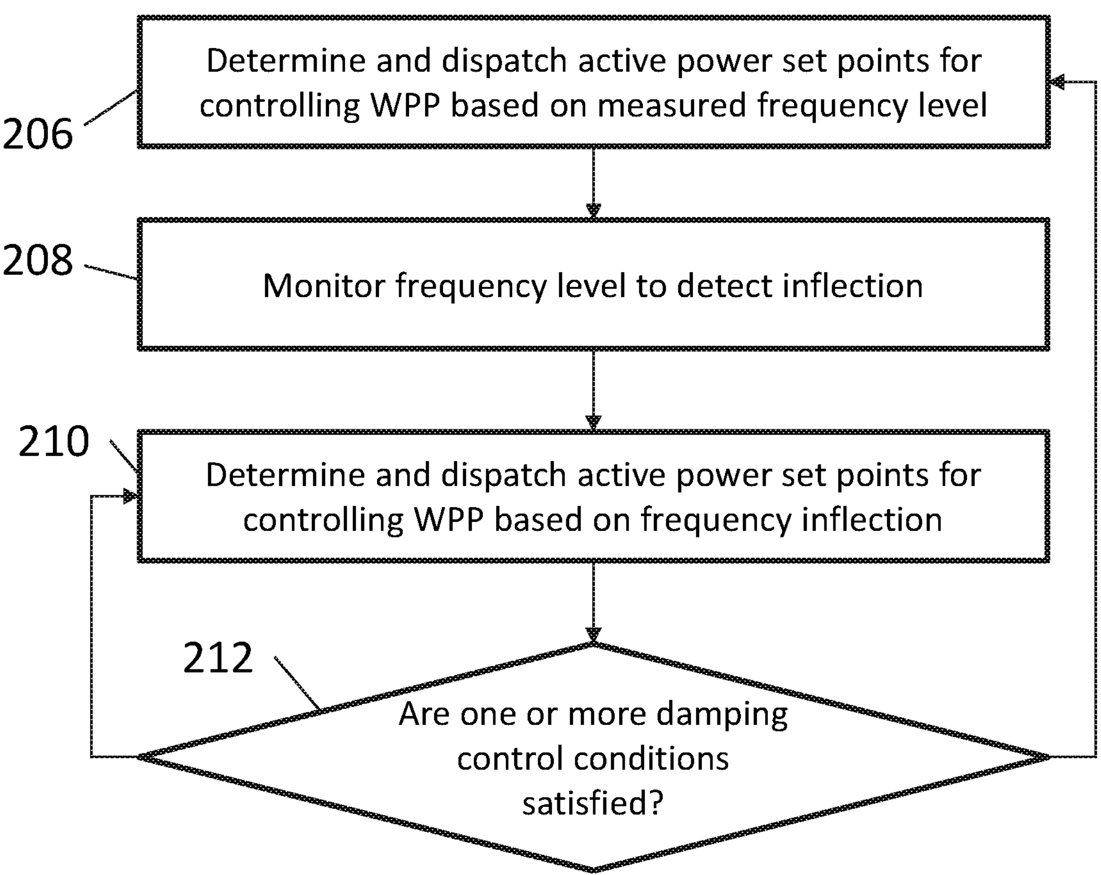
FIG. 6 shows example sub-steps, in accordance with an embodiment of the invention, of the method of FIG. 4.

FIG. 6 shows example sub-steps 206 to 212 of the step 204 of determining and dispatching set points in the method 200 for controlling the active power output of the WPP 12 during a frequency event, in accordance with an embodiment of the invention.

In sub-step 206, once the frequency deadband has been crossed, the control module 100 may be configured to determine and dispatch active power set points based on the measured frequency level 40.

For example, the control module 100 may determine the active power set points illustrated by the reference active power level 50, shown in FIG. 5, by ramping down from the baseline value. In particular, the control module 100 may access the look-up table 102 and determine a pre-determined ramp down rate, rr2, based on the measured frequency level 40 (or the increase thereof), and apply that ramp down rate to the baseline value. This has the effect of reducing the reference active power level 50 at a constant rate, as shown in FIG. 5, and thereby supporting the return of the grid 16 to the frequency deadband.

At the same time, the control module 100 monitors the frequency level, in sub-step 208, to detect an inflection in the measured frequency level. In particular, in this example, since the measured frequency level has exceeded the upper frequency limit of the frequency deadband (in an overfrequency event) the control module 100 is configured to detect a frequency peak in the measured frequency level. It shall be appreciated that the peak effectively indicates the maximum frequency level reached by the grid 16, which can be used to control the active power output. In other examples, the control module 100 may be configured to detect a trough during an underfrequency event, or the control module 100 may be configured to detect any point of inflection in the measured frequency level, regardless of the event being an overfrequency or an underfrequency event.

Various mathematical and graphical methods are known for determining such inflections, which are not described in detail here to avoid obscuring the invention.

As shown in FIG. 5, an inflection is detected, in sub-step 208, in the form of the peak at the point t2. At this point, the measured frequency level is at the frequency, f1. In this example, the frequency peak, f1, is between 51 and 52 Hz. Accordingly, in sub-step 210, upon detecting the inflection the control module 100 proceeds to apply the damping control scheme. In particular, the damping controller 101 is operated to determine and dispatch active power set points for controlling the WPP 12 based on the detected inflection until one or more damping control conditions are satisfied.

By way of example only, the damping controller 101 may start by determining an active power target value, P(f1), corresponding to the measured frequency level, f1, at the detected inflection. The damping controller 101 may then compare the reference active power level 50 to the active power target value, P(f1), and, in this instance, detect that the reference active power level 50 has reached the active power target value, P(f1). Accordingly, the damping controller 101 may proceed to determine and dispatch active power set points at the active power target value, P(f1), until the one or more damping control conditions are satisfied.

In this example, one such damping control condition may be satisfied when the measured frequency level rises to a frequency that is greater than the measured frequency level at the detected inflection, i.e. the frequency level f1.

For example, as shown in FIGS. 4 and 5, in the period following the point t2, the control module 100 may determine, in sub-step 212, whether the one or more damping control conditions are satisfied.

Whilst the measured frequency level remains below the frequency f1, the damping control condition is not satisfied and the control module 100 continues to determine and dispatch active power set points based on the detected inflection. The reference active power level 50 is therefore held constant for this period, as shown in FIG. 5, and the active power set points are output at the active power target value, P(f1). Notably, during this period there is a further inflection in the measured frequency level 40, in the form of a frequency trough. However, in this example, none of the damping control conditions of the control module 100 are satisfied by a frequency trough during an overfrequency event and so the damping control scheme remains in force.

However, when the measured frequency level rises above the frequency, f1, at the point t3 in FIG. 5, the control module 100 detects that the damping control condition is satisfied and the damping control scheme is removed. Accordingly, after the point t3, the control module 100 returns to determining the active power set points based on the measured frequency level, in sub-step 206.

As shown in FIG. 5, the control module 100 may therefore proceed to access the look-up table 102 and to determine the ramp down rate, rr2, once again, based on the measured frequency level 40 (or the increase thereof). The active power set points, represented by the reference active power level 50, therefore start to reduce once more after the point t3, further reducing the active power output of the WTGs 14.

As the reference active power level 50 ramps down, the control module 100 continues to monitor the measured frequency level 40, in sub-step 208, to detect a further point of inflection. In particular, the control module 100 now monitors the measured frequency level 40 to detect a frequency peak that is further from the frequency deadband than the previous frequency peak, f1.

Such an inflection is detected at the point t4, in FIG. 5, and the control module 100 proceeds to apply the damping scheme once more, in sub-step 210. However, in this instance, the control module 100 is configured to determine and dispatch active power set points based on the further inflection, i.e. the frequency peak, f2. For context, in this example the frequency peak, f2, is higher than frequency peak f1 but is also between 51 and 52 Hz.

Accordingly, the damping controller 101 may be operated to determine another active power target value, P(f2), corresponding to the measured frequency level, f2, at the further inflection. As before, the damping controller 101 may therefore compare the reference active power level 50 to the active power target value, P(f2), but, in this instance, the damping controller 101 will detect that the active power target value, P(f2), is at a lower value than the reference active power level 50 at the point t4. Accordingly, the damping controller 101 may access the lookup-table 102 to determine a corresponding ramp rate for reducing the reference active power level 50 towards the active power target value, P(f2). In this example, the control module 100 may access the look-up table 102 and find that the ramp down rate corresponding the active power target value, P(f2), is also the ramp down rate, rr2. Hence, the control module 100 may continue to determine and dispatch active power set points according to the ramp down rate, rr2, until the active power set points reach the active power target value, P(f2). This occurs slightly after the detected inflection, at the point t5 shown in FIG. 5. Once the reference active power level reaches the active power target value, P(f2), the control module 100 may proceed to dispatch active power set points at the active power target value, P(f2), until the one or more damping control conditions are satisfied.

In this context, FIG. 5 demonstrates a further damping control condition, which is satisfied when the WTGs 14 have provided an active power output at the active power target value, P(f2), for a predetermined application period.

For example, in sub-step 212, the control module 100 may start a timer when the reference active power level reaches the active power target value, P(f2), at the point t5, and the control module 100 may remove the damping control scheme when the application period has expired.

As shown in FIG. 5, the application period lasts until the point t6 and, for the period between the points t4 and t6, the control module 100 continues to determine and dispatch the active power set points based on the second active power target value, P(f2), in accordance with sub-step 210. In this manner, the control module 100 provides a stable active power output (despite the falling frequency level of the grid 16 during the application period) that supports the grid 16 in returning towards the frequency deadband.

It is hoped that applying the damping control scheme for the full extent of the application period will have the desired effect of urging the frequency level to return towards the frequency deadband. However, the grid frequency is sensitive to a range of variables and, in some conditions, this may not necessarily be the case. Nonetheless, it is considered appropriate to remove the damping control scheme upon expiry of the application period in order to adapt the active power level to the relevant conditions. For example, it may be necessary to increase the active power level upon expiry of the application period to prevent an overshoot of the frequency deadband.

Hence, upon expiry of the application period at the point t6, the control module 100 stops applying the damping control scheme and proceeds to determine and dispatch active power set points based on the measured frequency level, as in sub-step 206.

As the frequency level has not exceeded the previous peak frequency (f2) in this example, it can reasonably be assumed at this point that the measured frequency level is below the previous peak frequency (f2) and, accordingly, that the active power target value, P(f), corresponding to the measured frequency level, (f), will be higher than the reference active power level 50. Hence, upon removal of the damping control scheme, i.e. at the point t6, the control module 100 may initially determine a further active power target value, P(f3), corresponding to the measured frequency level (f3) at that point. For context, in the example shown in FIG. 5, the frequency level at the end of the application period, f3, is between 50 and 51 Hz. The control module 100 may then compare the reference active power level 50 to the determined active power target value, P(f3), and access the look-up table 102 to determine a corresponding ramp-up rate, rr1, based on the comparison. The ramp-up rate, rr1, may then be applied to the reference active power level 50, as shown in FIG. 5, so that the control module 100 determines and dispatches active power set points that increase successively towards the active power target value, P(f3).

As shown in FIG. 5, this has the effect of initially reducing the rate of reduction of the measured frequency level, in the period between the point t6 and a point t7, producing another frequency inflection, in the form a frequency trough in the measured frequency level 40. Thereafter, the measured frequency level 40 starts to increase again as the reference active power level 50 approaches the active power target value, P(f3).

However, before the reference active power level 50 reaches the active power target value, P(f3), the measured frequency level 40 changes direction again, forming another inflection in the form of the frequency peak, f(4), at a point t8 shown in FIG. 5. The frequency peak, f4, is between 50.5 and 51 Hz in this example. This further peak is indicative of the fluctuating nature of the grid frequency during overfrequency events and is detected, in sub-step 208, by the control module 100.

Accordingly, the control module 100 proceeds, in sub-step 210, to determine and dispatch active power set points once more based on the frequency peak (f4), substantially as described previously. Upon accessing the look-up table 102, the damping controller 101 may therefore determine the active power target value, P(f4), and, since the active power target value, P(f4) is very close to the previous active power target value, P(f3), in this case, the damping controller 101 may proceed to determine the same ramp up rate, rr1, based on the comparison of the reference active power level 50 and the active power target value, P(f4).

The frequency damping control module 100 may then start a timer, once again, in sub-step 212, when the reference active power level 50 eventually reaches the active power target value, P(f4), at a point t9 in FIG. 5. However, in this example, as the timer proceeds, and before the application period has expired, a further damping control condition is satisfied at the point t10. In particular, the measured frequency level 40 falls below a lower threshold frequency, such as the upper limit of the frequency deadband, which satisfies a further damping control condition of the control module 100. Accordingly, the damping control scheme is removed.

At the point t10, the method 200 has supported a quick return of the measured frequency level 40 to the frequency deadband and the PPC 20 may revert to the deadband frequency mode of operation for continued operation of the WTGs 14. The method 200 therefore dampens the active power output to avoid, or substantially mitigate, any damage to the WPP 12 caused by the fluctuating frequency event and the grid frequency is quickly returned to the acceptable operating range.

As shown in FIG. 5, although the control module 100 may stop dispatching active power set points upon returning to the frequency deadband, the control module 100 may nevertheless ramp up the reference active power level 50 towards the baseline value, for example using the ramp up rate, rr1, after the point t10. Accordingly, if the measured frequency level 40 subsequently moves outside of the frequency deadband again, in an overfrequency or an underfrequency event, the method 200 may be restarted to support another return to the frequency deadband.

It shall be appreciated that, although the example charts illustrate an over-frequency event, where the active power output is reduced to support the main grid 16, the method 200 is equally applicable to an under-frequency event, where the active power is increased to support the main grid 16.

Furthermore, in the above example of the invention, the control module 100 is configured to remove the damping control scheme once any one of the damping control conditions are satisfied. However, in other examples of the invention, the control module 100 may be configured to remove the damping control scheme only once a plurality of damping control conditions are satisfied, and in some cases each damping control condition must be satisfied before the control scheme is removed.

It will be appreciated that various changes and modifications can be made to the examples described above without departing from the scope of the present invention.

The invention claimed is:

1. A method for controlling a renewable energy power plant when a frequency level of a power network, to which the power plant is connected, is outside of a frequency deadband, the method comprising:

receiving a measured frequency level of the power network;

determining and dispatching set points for controlling a power characteristic of the power plant based on the measured frequency level, wherein the set points are determined based on a reference active power level, which start at a baseline value and ramp up or ramp down in dependence on the measured frequency level, and wherein one or more look-up tables comprise pre-determined ramp rates for increasing or decreasing the reference active power level;

monitoring changes in the measured frequency level to detect inflections, in the form of peaks or troughs, in the measured frequency level; and when an inflection is detected, applying a damping control scheme comprising determining and dispatching set points for controlling the power characteristic based on that inflection, until one or more damping control conditions are satisfied, wherein the one or more damping control conditions include a condition that is satisfied when the measured frequency level rises above a lower threshold frequency or falls below an upper threshold frequency.

2. A method according to claim 1, wherein the damping control scheme comprises determining and dispatching set points at a target value for controlling the power characteristic, the target value being determined based on the frequency level at the detected inflection; wherein the damping control scheme comprises determining and dispatching set points that ramp towards the determined target value for the controlled power characteristic.

3. A method according to claim 2, wherein the damping control scheme comprises dispatching set points at the target value until the one or more damping control conditions are satisfied.

4. A method according to claim 2, wherein the damping control scheme comprises determining the target value for the controlled power characteristic using a look-up table comprising a plurality of target values for the controlled power characteristic, each target value corresponding to a respective frequency of the power network.

5. A method according to claim 4, wherein the damping control scheme comprises determining a ramp rate for ramping the set points towards the target value for the controlled power characteristic, the ramp rate being determined using a look-up table comprising a plurality of ramp rates for the set points.

6. A method according to claim 2, wherein the one or more damping control conditions include a condition that is satisfied upon expiry of an application period, wherein the application period is a minimum period of time for which the damping control scheme determines and dispatches active power set points based on the detected inflection.

7. A method according to claim 6, wherein the damping control scheme is configured to start the application period once the controlled power characteristic reaches the target value.

8. A method according to claim 1, further comprising comparing the measured frequency level to the frequency deadband to determine an overfrequency event or an underfrequency event.

9. A method according to claim 8, further comprising, performing at least one of:

upon determining an overfrequency event, monitoring changes in the measured frequency level to detect inflections in the form of peaks of the measured frequency level; or upon determining an underfrequency event, monitoring changes in the measured frequency level to detect inflections in the form of troughs of the measured frequency level.

10. A method according to claim 1, wherein the one or more damping control conditions include a condition that is satisfied upon detection of a further inflection.

11. A method according to claim 9, wherein the further inflection takes the form of:

a further peak of the measured frequency level during an overfrequency event, the further peak being at an increased frequency level; or a further trough of the measured frequency level during an underfrequency event, the further trough being at a reduced frequency level.

12. A method according to claim 10, wherein, upon detection of the further inflection, the damping control scheme is removed and another damping control scheme is applied for determining and dispatching set points for controlling the power characteristic based on the further inflection.

13. A method according to claim 1, wherein the condition is satisfied when the measured frequency level rises above the lower threshold frequency during a determined underfrequency event.

14. A method according to claim 1, wherein the condition is satisfied when the measured frequency level falls below the upper threshold frequency during a determined overfrequency event.

15. A power plant controller, comprising:

an input/output (I/O) interface;

a memory;

a processor coupled to the memory and the I/O interface by a bus; wherein the processor is programmed to perform an operation for controlling a renewable energy power plant when a frequency level of a power network, to which the power plant is connected, is outside of a frequency deadband, the operation comprising:

receiving a measured frequency level of the power network;

determining and dispatching set points for controlling a power characteristic of the power plant based on the measured frequency level, wherein the set points are determined based on a reference active power level, which start at a baseline value and ramp up or ramp down in dependence on the measured frequency level, and wherein one or more look-up tables comprise pre-determined ramp rates for increasing or decreasing the reference active power level;

monitoring changes in the measured frequency level to detect inflections, in the form of peaks or troughs, in the measured frequency level; and when an inflection is detected, applying a damping control scheme comprising determining and dispatching set points for controlling the power characteristic based on that inflection, until one or more damping control conditions are satisfied, wherein the one or more damping control conditions include a condition that is satisfied when the measured frequency level rises above a lower threshold frequency or falls below an upper threshold frequency.

16. The power plant controller according to claim 15, wherein the damping control scheme comprises determining and dispatching set points at a target value for controlling the power characteristic, the target value being determined based on the frequency level at the detected inflection; and wherein the damping control scheme comprises determining and dispatching set points that ramp towards the determined target value for the controlled power characteristic.

17. The power plant controller according to claim 16, wherein the damping control scheme comprises dispatching set points at the target value until the one or more damping control conditions are satisfied.

18. The power plant controller according to claim 17, wherein the damping control scheme comprises determining the target value for the controlled power characteristic using a look-up table comprising a plurality of target values for the controlled power characteristic, each target value corresponding to a respective frequency of the power network.

19. The power plant controller according to claim 18, wherein the damping control scheme comprises determining a ramp rate for ramping the set points towards the target value for the controlled power characteristic, the ramp rate being determined using a look-up table comprising a plurality of ramp rates for the set points.

20. The power plant controller according to claim 15, wherein the one or more damping control conditions include a condition that is satisfied upon expiry of an application period, wherein the application period is a minimum period of time for which the damping control scheme determines and dispatches active power set points based on the detected inflection.

* * * * *